US010686942B2

(12) United States Patent
Mani et al.

(10) Patent No.: US 10,686,942 B2
(45) Date of Patent: *Jun. 16, 2020

(54) AUTO-TUNING OF ACOUSTIC ECHO CANCELLER

(71) Applicant: Imagination Technologies Limited, Kings Langley (GB)

(72) Inventors: Senthil Kumar Mani, Hyderabad (IN); Gandhi Namani, Hyderabad (IN); Srinivas Akella, Hyderabad (IN); Sai Ravi Teja Pulugurtha, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,839

(22) Filed: May 13, 2019

(65) Prior Publication Data
US 2019/0268478 A1    Aug. 29, 2019

Related U.S. Application Data

(60) Continuation of application No. 15/617,648, filed on Jun. 8, 2017, now Pat. No. 10,334,113, which is a (Continued)

(30) Foreign Application Priority Data

Apr. 2, 2014    (GB) .................................. 1405965.3

(51) Int. Cl.
*H04M 9/08* (2006.01)
*G10L 21/02* (2013.01)
*H04L 5/16* (2006.01)

(52) U.S. Cl.
CPC ............. *H04M 9/082* (2013.01); *G10L 21/02* (2013.01); *H04L 5/16* (2013.01); *H04M 9/08* (2013.01)

(58) Field of Classification Search
CPC ........ H04M 9/082; H04M 3/002; H04B 3/234
(Continued)

(56) References Cited

U.S. PATENT DOCUMENTS 4,628,156 A   12/1986 Irvin
6,125,179 A    9/2000 Wu
(Continued)

FOREIGN PATENT DOCUMENTS

CN          1822709 A       8/2006
CN        101346896 A       1/2009
(Continued)

OTHER PUBLICATIONS

Birkett et al "Limitations of Handsfree Acoustic Echo Cancellers due to Nonlinear Loudspeaker Distortion and Enclosure Vibration Effects" Department of Systems and Computer Engineering Carleton University, Ottawa, Canada.
(Continued)

*Primary Examiner* — Alexander Krzystan
(74) *Attorney, Agent, or Firm* — Potomac Law Group, PLLC; Vincent M DeLuca

(57) ABSTRACT

A gain control system for dynamically tuning an echo canceller, the echo canceller being configured to estimate an echo of a far-end signal and subtract that echo estimate from a microphone signal to output an echo cancelled signal, the gain control system comprising a monitoring unit configured to estimate an energy associated with an impulse response of an adaptive filter configured to generate the echo estimate from the far-end signal and a gain tuner configured to adjust an attenuation of at least one of the microphone signal and the far-end signal in dependence on the estimated energy.

15 Claims, 9 Drawing Sheets

Related U.S. Application Data division of application No. 14/677,745, filed on Apr. 2, 2015, now Pat. No. 9,706,057.

(58) Field of Classification Search
USPC .................................................. 379/406.05
See application file for complete search history.

(56) References Cited

U.S. PATENT DOCUMENTS

| | | | |
|---|---|---|---|
| 6,570,985 B1 | 5/2003 | Romesburg | |
| 6,694,017 B1 | 2/2004 | Takada | |
| 8,208,621 B1 | 6/2012 | Hsu | |
| 2003/0123399 A1 | 7/2003 | Zhang et al. | |
| 2006/0013383 A1 | 1/2006 | Barron et al. | |
| 2006/0072766 A1 | 4/2006 | Klein et al. | |
| 2008/0189116 A1 | 8/2008 | LeBlanc et al. | |
| 2010/0020986 A1 | 1/2010 | Nemer et al. | |
| 2010/0057454 A1 | 3/2010 | Mohammad et al. | |
| 2010/0061568 A1 | 3/2010 | Rasmussen | |
| 2010/0246804 A1 | 9/2010 | Prakash et al. | |
| 2012/0250852 A1* | 10/2012 | Rowley ................. | H04M 9/082 379/406.01 |

FOREIGN PATENT DOCUMENTS

| | | |
|---|---|---|
| CN | 102957819 A | 3/2013 |
| CN | 103391381 A | 11/2013 |
| CN | 103491488 A | 1/2014 |
| EP | 1104116 A2 | 5/2001 |
| WO | 95/28774 A1 | 10/1995 |
| WO | 96/25733 A1 | 8/1996 |
| WO | 03/094486 A1 | 11/2003 |
| WO | 2004/002002 A1 | 12/2003 |

OTHER PUBLICATIONS

Breining et al. "Acoustic echo control—An Application of Very High Order Adaptive Filters" published in IEEE Signal Processing Magazine, vol. 16, No. 4, pp. 42-69, 1999.

Carini "The Road of an Acoustic Echo Controller for Mobile Telephony From Product Definition Till Production" Telit Mobile Terminals S.p.A. Viale Stazione di Prosecco 5/B1-34010 Sgonico (Trieste) Italy.

Faller et al "Supressing Acoustic Echo in a Spectral Envelope Space" IEEE Transactions on Speech and Audio Processing, vol. 13, No. 5, Sep. 2005, pp. 1048-1062.

Haensler "From Algorithms to Systems—Its a Rocky Road" Signal Theory, Signal Theory, Darmstadt University of Technology and Proceedings of the IEEE, vol. 66, No. 12, Dec. 1978.

Ye et al. "A New Double-Talk Detection Algorithm Based on the Orthogonality Theorem" IEEE Transactions on Communications, vol. 39, No. 11, Nov. 1991, pp. 1542-1545.

Benesty et al. "Advances in Network and Acoustic Echo Cancellation" Springer-Verlag Berlin Heidelberg 2001, pp. 1-22.

Dentino et al, "Adaptive Filtering in the Frequency Domain", Proceedings of the IEEE, vol. 66, No. 12, Dec. 1978, pp. 1658-1659.

Niguyen-Ky et al "An Improved Error Estimation Algorithm for Stereophonic Acoustic Echo Cancellation Systems" Faculty of Engineering and Surveying University of Southern Queensland Toowoomba Queensland 4350.

*Copies of NPL in Parent Application**.

* cited by examiner

AUTO-TUNING OF ACOUSTIC ECHO CANCELLER

CROSS-REFERENCE TO RELATED APPLICATIONS

This application is a continuation under 35 U.S.C. 120 of copending application Ser. No. 15/617,648 filed Jun. 8, 2017, which is a division of application Ser. No. 14/677,745 filed Apr. 2, 2015, now U.S. Pat. No. 9,706,057, which claims foreign priority under 35 U.S.C. 119 from United Kingdom Application No. 1405965.3 filed Apr. 2, 2014. The contents of these related applications are hereby incorporated by reference herein in their entireties.

BACKGROUND OF THE INVENTION

This invention relates to a method and apparatus for dynamically tuning an acoustic echo canceller.

In telephony, an echo is a reflection of the voice signal. It is a delayed copy of the original. An example scenario is illustrated in FIG. 1a, which shows a signal being captured by a far-end microphone and output by a near-end loudspeaker. The echo is a consequence of acoustic coupling between the loudspeaker and the microphone; the microphone captures the signal originating from its own loudspeaker in addition to the voice of the near-end speaker and any background noise. The result is an echo at the far-end loudspeaker. Echo cancellation is an important feature of telephony. Hands-free devices and teleconferencing, in particular, require echo cancellation that can adapt to environments having a wide range of acoustic characteristics.

Acoustic echo cancellers typically synthesise an estimate of the echo from the far-end voice signal. The estimated echo is then subtracted from the microphone signal. This technique requires adaptive signal processing to generate a signal accurate enough to cancel the echo effectively. An adaptive filter is often used to model the environment's acoustic impulse response. The adaptive filter is often followed by a non-linear processor (NLP) for removing any residual echo. The non-linear processor may be accompanied by a comfort noise generator (CNG), since periods of complete silence can be disconcerting for a user.

The performance of the echo canceller depends on the platform, and particularly on the audio interface, the interface driver and related hardware, the pre and post amplifier (if any), and characteristics of microphone and speaker. It is challenging to achieve full duplex voice communication on a wide variety of platforms with sufficient echo cancellation. Therefore, the majority of echo cancellers require some form of platform-specific tuning to provide optimal performance. Often, this platform specific tuning has to be performed manually.

Therefore, there is a need for an improved method for tuning an acoustic echo canceller.

BRIEF SUMMARY OF THE INVENTION

There is provided a threshold control system for controlling a non-linear processor in an echo canceller, the non-linear processor being configured to remove any signal energy below a threshold that remains in a microphone signal after the echo canceller has subtracted an echo estimate from it, the threshold control system comprising a convergence unit configured to determine an indication of the stability of an adaptive filter, the adaptive filter being configured to continuously model an echo path so as to generate the echo estimate, and a threshold tuner configured to adjust the threshold of the non-linear processor in dependence on the indication.

The threshold control system may be configured to control the non-linear processor only if an indication of the echo cancellation achieved by the echo canceller subtracting the echo estimate from the microphone signal is above a predetermined threshold.

The convergence unit may be configured to determine the indication of the stability of the adaptive filter by comparing one or more of the adaptive filter's coefficients with a set of average coefficients.

The convergence unit may be configured to update the set of average coefficients as the adaptive filter models the echo path.

The threshold tuner may be configured to adjust the threshold so as to change the operating mode of a communication device between two or more of: a full-duplex mode, a partial duplex mode and a half-duplex mode.

The threshold tuner may be configured to adjust the threshold such that, the greater the deviation of the adaptive filter's coefficients from the set of average coefficients, the higher the threshold.

The threshold tuner may be configured to, if the adaptive filter's coefficients show substantially no deviation from the set of average coefficients, control the non-linear processor such that the communication device operates in full-duplex mode.

The threshold tuner may be configured to, if the adaptive filter's coefficients show a substantial deviation from the set of average coefficients, control the non-linear processor such that the communication device operates in half-duplex mode.

The convergence unit may be configured to calculate a value indicative of the deviation of the adaptive filter's coefficients from the set of average coefficients, and the threshold unit may be configured to control the non-linear processor such that the communication device operates in full duplex mode if that value is less than a first threshold, control the non-linear processor such that the communication device operates in partial duplex mode if that value is greater than or equal to the first threshold and less than a second threshold, and control the non-linear processor such that the communication device operates in half duplex mode if that value is greater than or equal to the second threshold.

The convergence unit may be configured to treat the microphone signal as comprising a plurality of time frames, the convergence unit comprising a monitoring unit configured to, for each time frame of the microphone signal, identify a set of adaptive filter coefficients corresponding to that section, compare one or more of the identified set of coefficients with a set of average coefficients, assign the section of the microphone signal a region in dependence on the comparison and update a threshold associated with the assigned region in dependence on the comparison.

The convergence unit may be configured to, when the monitoring unit has assigned a region to each one of the plurality of time frames, identify the threshold associated with the region that was most frequently assigned and adjust the threshold of the non-linear processor to be the same as the identified threshold.

The convergence unit may be configured to update the threshold associated with the region by adjusting it in dependence on the comparison and a smoothing parameter that is associated with that region.

The convergence unit may be configured to adjust the threshold associated with the region by adjusting it in dependence on the comparison and a smoothing parameter that is associated with a combination of that region and the region with which the previous section of the microphone signal was associated.

The convergence unit may comprise a counter configured to count the number of occasions on which a region is assigned to one of the plurality of time frames.

The counter may be configured to, if it determines that double talk is present in one of the plurality of time frames, set the count for the region to which that time frame was assigned to zero.

The counter may be configured to, when the monitoring unit has assigned a region to each of the plurality of time frames, reset the count for all regions to zero.

The threshold control system may comprise a confirmation unit configured to determine if the threshold for the non-linear processor is stable and, if so, stop the threshold tuner from controlling the non-linear processor.

The threshold control system may comprise an energy estimator configured to estimate an energy associated with an impulse response of the adaptive filter and, in dependence on said estimated energy, select one or more of the adaptive filter's coefficients for comparing with the average set of coefficients.

The energy estimator may be configured to identify one or more of the adaptive filter's coefficients for comparing with the average set of coefficients by treating each time frame of the microphone signal as comprising a plurality of sections, identifying an impulse response of the adaptive filter that corresponds to each section, estimating an energy associated with the impulse response identified for each section, determining that one or more of the identified impulse responses is associated with a dominant energy and selecting one or more of the adaptive filter's coefficients that correspond to those one or more impulse responses for comparing with the average set of coefficients.

The energy estimator may be configured to determine that an impulse response is associated with a dominant energy if a ratio of the estimated energy associated with that impulse response to a total estimated energy for the impulse responses associated with all of the plurality of sections is greater than a predetermined threshold.

The energy estimator may be configured to estimate an energy associated with an impulse response by dividing the impulse response into a plurality of overlapping sections, identifying a set of said overlapping sections that are associated with the section of the microphone signal to which the impulse response corresponds, estimating an energy comprised in each section of the set and summing the estimated energies for the set.

There is provided a method for controlling a non-linear processor in an echo canceller, the non-linear processor being configured to remove any signal energy below a threshold that remains in a microphone signal after the echo canceller has subtracted an echo estimate from it, the method comprising determining an indication of the stability of an adaptive filter, the adaptive filter being configured to continuously model an echo path so as to generate the echo estimate, and adjusting the threshold of the non-linear processor in dependence on the indication.

The method may comprise controlling the non-linear processor only if an indication of the echo cancellation achieved by the echo canceller subtracting the echo estimate from the microphone signal is above a predetermined threshold.

The method may comprise determining the indication of the stability of the adaptive filter by comparing one or more of the adaptive filter's coefficients with a set of average coefficients.

The method may comprise updating the set of average coefficients as the adaptive filter models the echo path.

The method may comprise adjusting the threshold so as to change the operating mode of a communication device between two or more of: a full-duplex mode, a partial duplex mode and a half-duplex mode.

The method may comprise adjusting the threshold such that, the greater the deviation of the adaptive filter's coefficients from the set of average coefficients, the higher the threshold.

The method may comprise, if the adaptive filter's coefficients show substantially no deviation from the set of average coefficients, controlling the non-linear processor such that the communication device operates in full-duplex mode.

The method may comprise, if the adaptive filter's coefficients show a substantial deviation from the set of average coefficients, controlling the non-linear processor such that the communication device operates in half-duplex mode.

The method may comprise calculating a value indicative of the deviation of the adaptive filter's coefficients from the set of average coefficients, controlling the non-linear processor such that the communication device operates in full duplex mode if that value is less than a first threshold, controlling the non-linear processor such that the communication device operates in partial duplex mode if that value is greater than or equal to the first threshold and less than a second threshold and controlling the non-linear processor such that the communication device operates in half duplex mode if that value is greater than or equal to the second threshold.

The method may comprise treating the microphone signal as comprising a plurality of time frames and, for each time frame, identifying a set of adaptive filter coefficients corresponding to that section, comparing one or more of the identified set of coefficients with a set of average coefficients, assigning the section of the microphone signal a region in dependence on the comparison, and updating a threshold associated with the assigned region in dependence on the comparison.

The method may comprise, when a region has been assigned to each one of the plurality of time frames, identifying the threshold associated with the region that was most frequently assigned, and adjusting the threshold of the non-linear processor to be the same as the identified threshold.

The method may comprise adjusting the threshold associated with the region by adjusting it in dependence on the comparison and a smoothing parameter that is associated with that region.

The method may comprise adjusting the threshold associated with the region by adjusting it in dependence on the comparison and a smoothing parameter that is associated with a combination of that region and the region with which the previous section of the microphone signal was associated.

The method may comprise counting the number of occasions on which a region is assigned to one of the plurality of time frames.

The method may comprise determining that double talk is present in one of the plurality of time frames and setting the count for the region to which that time frame was assigned to zero.

The method may comprise, when each of the plurality of time frames has been assigned a region, resetting the count for all regions to zero.

The method may comprise determining if the threshold for the non-linear processor is stable and, if so, stopping the control of the non-linear processor.

The method may comprise estimating an energy associated with an impulse response of the adaptive filter and, in dependence on said estimated energy, selecting one or more of the adaptive filter's coefficients for comparing with the average set of coefficients.

The method may comprise identifying one or more of the adaptive filter's coefficients for comparing with the average set of coefficients by treating each time frame of the microphone signal as comprising a plurality of sections, identifying an impulse response of the adaptive filter that corresponds to each section, estimating an energy associated with the impulse response identified for each section, determining that one or more of the identified impulse responses is associated with a dominant energy; and selecting one or more of the adaptive filter's coefficients that correspond to those one or more impulse responses for comparing with the average set of coefficients.

The method may comprise determining that an impulse response is associated with a dominant energy if a ratio of the estimated energy associated with that impulse response to a total estimated energy for the impulse responses associated with all of the plurality of sub-sections is greater than a predetermined threshold.

The method may comprise estimating an energy associated with an impulse response by dividing the impulse response into a plurality of overlapping sections, identifying a set of said overlapping sections that are associated with the section of the microphone signal to which the impulse response corresponds, estimating an energy comprised in each section of the set and summing the estimated energies for the set.

There is provided a gain control system for dynamically tuning an echo canceller, the echo canceller being configured to estimate an echo of a far-end signal and subtract that echo estimate from a microphone signal to output an echo cancelled signal, the system comprising a monitoring unit configured to estimate an energy associated with an impulse response of an adaptive filter configured to generate the echo estimate from the far-end signal and a gain tuner configured to adjust an attenuation of at least one of the microphone signal and the far-end signal in dependence on the estimated energy.

The gain tuner may be configured to, if the energy associated with the impulse response is relatively high, determine that the adaptive filter has saturated.

The gain tuner may be configured to, if it determines that the adaptive filter has saturated, increase the attenuation of the microphone signal.

The gain tuner may be configured to, if the energy associated with the impulse response is relatively low, determine that the adaptive filter has not saturated.

The gain tuner may be configured to, if it determines that the adaptive filter has not saturated, decrease the attenuation of the microphone signal.

The gain tuner may be configured to decrease the attenuation of the microphone signal if the estimated energy is below a first threshold, maintain the attenuation of the microphone signal if the estimated energy is greater than or equal the first threshold and less than or equal to a second threshold, and increase the attenuation of the microphone signal if the estimated energy is above the second threshold.

The gain tuner may be configured to, before it increases the attenuation of the microphone signal, compare the attenuation of the microphone signal and the attenuation of the far-end signal and: if the far-end signal attenuation is lower than the microphone signal attenuation, increase the attenuation of the microphone signal; and, otherwise, decrease the attenuation of the far-end signal and maintain the attenuation of the microphone signal.

The monitoring unit may comprise an energy estimator configured to estimate the energy associated with an impulse response by treating the microphone signal as comprising a plurality of sections, the energy estimator being configured to estimate an energy associated with the impulse response corresponding to each section of the microphone signal, determine that one or more of the identified impulse responses is associated with a dominant energy, and adjust an attenuation of at least one of the microphone signal and the far-end signal in dependence on the dominant energy.

The energy estimator may be configured to determine that an impulse response is associated with a dominant energy if a ratio of the estimated energy associated with that impulse response to a total estimated energy for the impulse responses associated with all of the plurality of sections is greater than a predetermined threshold.

The energy estimator may be configured to estimate an energy associated with an impulse response by dividing the impulse response into a plurality of overlapping sections, estimating an energy comprised in each section, and summing the estimated energies.

There is provided a method for dynamically tuning an echo canceller, the echo canceller being configured to estimate an echo of a far-end signal and subtract that echo estimate from a microphone signal to output an echo cancelled signal, the method comprising estimating an energy associated with an impulse response of an adaptive filter configured to generate the echo estimate from the far-end signal, and adjusting an attenuation of at least one of the microphone signal and the far-end signal in dependence on the estimated energy.

The method may comprise, if the energy associated with the impulse response is relatively high, determining that the adaptive filter has saturated.

The method may comprise, if it is determined that the adaptive filter has saturated, increasing the attenuation of the microphone signal.

The method may comprise, if the energy associated with the impulse response is relatively low, determining that the adaptive filter has not saturated.

The method may comprise, if it is determined that the adaptive filter has not saturated, decreasing the attenuation of the microphone signal.

The method may comprise decreasing the attenuation of the microphone signal if the estimated energy is below a first threshold, maintaining the attenuation of the microphone signal if the estimated energy is greater than or equal the first threshold and less than or equal to a second threshold, and increasing the attenuation of the microphone signal if the estimated energy is above the second threshold.

The method may comprise, before increasing the attenuation of the microphone signal, comparing the attenuation of the microphone signal and the attenuation of the far-end signal; and if the far-end signal attenuation is lower than the microphone signal attenuation, increasing the attenuation of the microphone signal; and otherwise, decreasing the attenuation of the far-end signal and maintain the attenuation of the microphone signal.

The method may comprise treating the microphone signal as comprising a plurality of sections, estimating an energy associated with the impulse response corresponding to each section of the microphone signal, determining that one or more of the identified impulse responses is associated with a dominant energy and adjusting an attenuation of at least one of the microphone signal and the far-end signal in dependence on the dominant energy.

The method may comprise determining that an impulse response is associated with a dominant energy if a ratio of the estimated energy associated with that impulse response to a total estimated energy for the impulse responses associated with all of the plurality of sections is greater than a predetermined threshold.

The method may comprise estimating an energy associated with an impulse response by dividing the impulse response into a plurality of overlapping sections, estimating an energy comprised in each section, and summing the estimated energies.

BRIEF DESCRIPTION OF THE DRAWINGS

The present invention will now be described by way of example with reference to the accompanying drawings. In the drawings.

DETAILED DESCRIPTION OF THE INVENTION

Figure 1A:
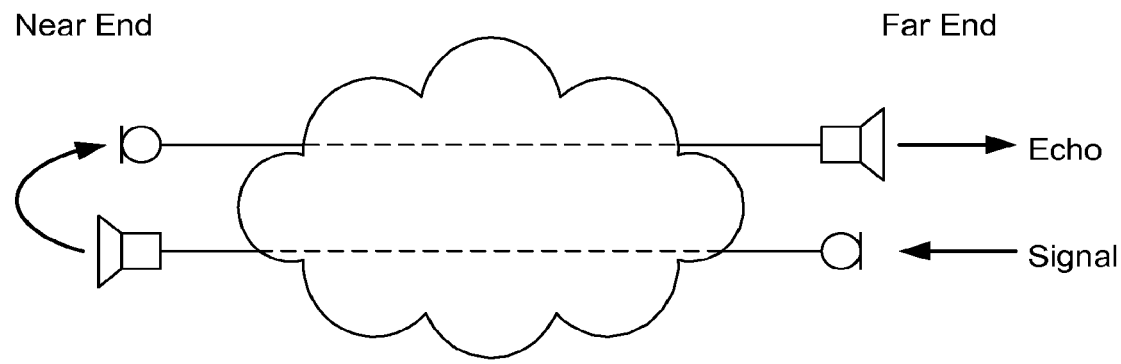
FIG. 1a shows an example of two communication devices.
Figure 1B:
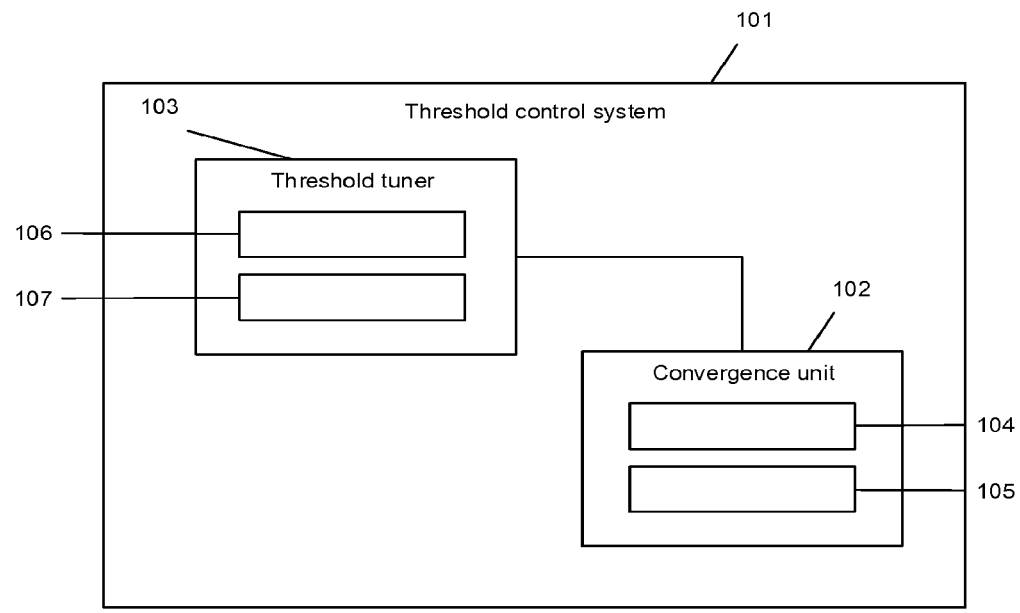
FIG. 1b shows an example of a threshold control system.

An example of a threshold control system is shown generally at 101 in FIG. 1b. It is arranged to control the threshold of a non-linear processor in an echo canceller. The echo canceller may be comprised in a communication device configured to implement two-way voice communication over a wired or wireless link.

A typical echo canceller comprises an adaptive filter for continuously modelling the echo path and generating an echo estimate from the far-end signal. The echo estimate is then subtracted from the microphone signal. The non-linear processor is typically configured to remove any signal energy below a threshold that remains in the microphone signal after the echo canceller has subtracted the echo estimate from it. The threshold therefore determines how much energy the non-linear processor removes from the microphone signal before it is transmitted to the far-end. If the threshold is low, the non-linear processor effectively just removes any remnants of the echo that remain because the adaptive filter has not perfectly modelled the echo path. If the threshold is high, however, the non-linear processor effectively blocks any signal from the near-end. This means that controlling the threshold effectively controls a mode of operation of the communication device. When the threshold is low, the communication device operates in full duplex mode by permitting signals to travel in both directions. When the threshold is high, the communication device operates in half-duplex mode by permitting signals to travel in one direction only (i.e. from the far-end to the near-end).

The threshold control system shown in FIG. 1b comprises a convergence unit 102 configured to determine an indication of the stability of an adaptive filter. It also comprises a threshold tuner 103 configured to adjust the threshold of the non-linear processor in dependence on the indication. The convergence unit further comprises an energy estimator 104 and a counter 105. The threshold tuner also comprises a confirmation unit 106 and an adaptation counter 107. The operation of these units is described in more detail below.

Figure 1C:
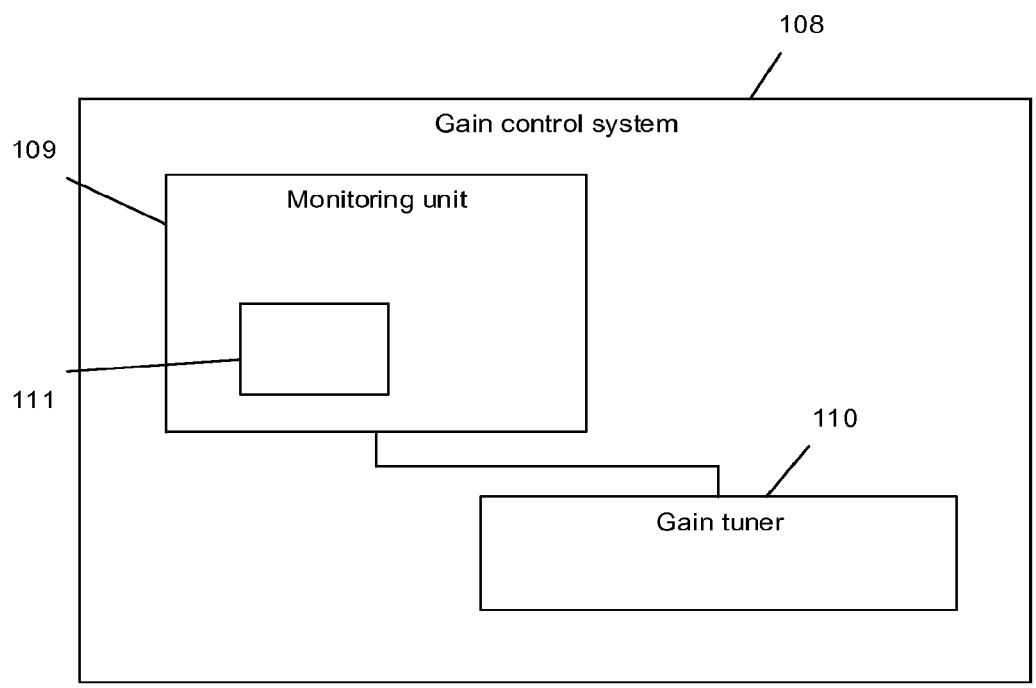
FIG. 1c shows an example of a gain control system.

An example of a gain control system is shown generally at 108 in FIG. 1c. The gain control system comprises a monitoring unit 109, which is configured to estimate an energy associated with an impulse response of the adaptive filter. The monitoring unit may include an energy estimator 111 for estimating the energies of impulse responses associated with multiple sections of the microphone signal and identifying which of the impulse responses appears to be dominant from an energy perspective. The gain control system also comprises a gain tuner 110 configured to adjust an attenuation of at least one of the microphone signal and the far-end signal in dependence on the energy estimated for the impulse response.

The gain control system may be implemented together with the threshold control system, in which case they may efficiently share one or more functional units, such as the monitoring unit, convergence unit and echo estimator. The gain control system and threshold control system may also be implemented separately and completely independently of each other.

An aim of both the threshold control system and the gain control system is to obtain some indication of the stability of the adaptive filter. This indication is then used to automatically tune the operational parameters of the echo canceller—the non-linear processor threshold in the case of the threshold control system and attenuation in the case of the gain controller—and thus avoid the need to manually tune these parameters.

In most implementations the threshold control system and the gain control system will control the same echo canceller. They will often form part of a communication device, typically the same communication device that comprises the echo canceller. Examples of suitable communication devices include mobile phones, smart phones, line connected phones, laptops, tablets, teleconferencing equipment etc. A typical communication device includes a loudspeaker for outputting the far-end signal, a microphone for detecting the near-end signal, a CPU, memory, signal processing circuitry, such as a DSP and filters, etc.

The structures shown in FIGS. 1b and 1c (and indeed all the block apparatus diagrams included herein) are intended to correspond to a number of functional blocks in an apparatus. This is for illustrative purposes only. FIGS. 1b and 1c are not intended to define a strict division between different parts of hardware on a chip or between different programs, procedures or functions in software. In some embodiments, some or all of the algorithms described herein may be performed wholly or partly in hardware. In many implementations, at least part of the threshold control system and the gain control system may be implemented by a processor acting under software control (e.g. the CPU or DSP of a communication device). Any such software is preferably stored on a non-transient computer readable medium, such as a memory (RAM, cache, hard disk etc) or other storage means (USB stick, CD, disk etc).

Often the main source of signal energy in the microphone signal will be an echo of the far-end signal; there is no other source of significant signal energy at the near-end. This is denoted "single talk" herein. At other times, the microphone signal will contain significant signal energy that is independent of any echo. In many instances this will be due to talking at the near-end. This is denoted "double talk" herein. The signal energy might, of course, be due to a different source than talking. This is particularly true during teleconferencing or hands-free operation. The term "double talk" is therefore used to refer to any significant signal energy in the near-end signal that is not due to an echo.

Figure 2:
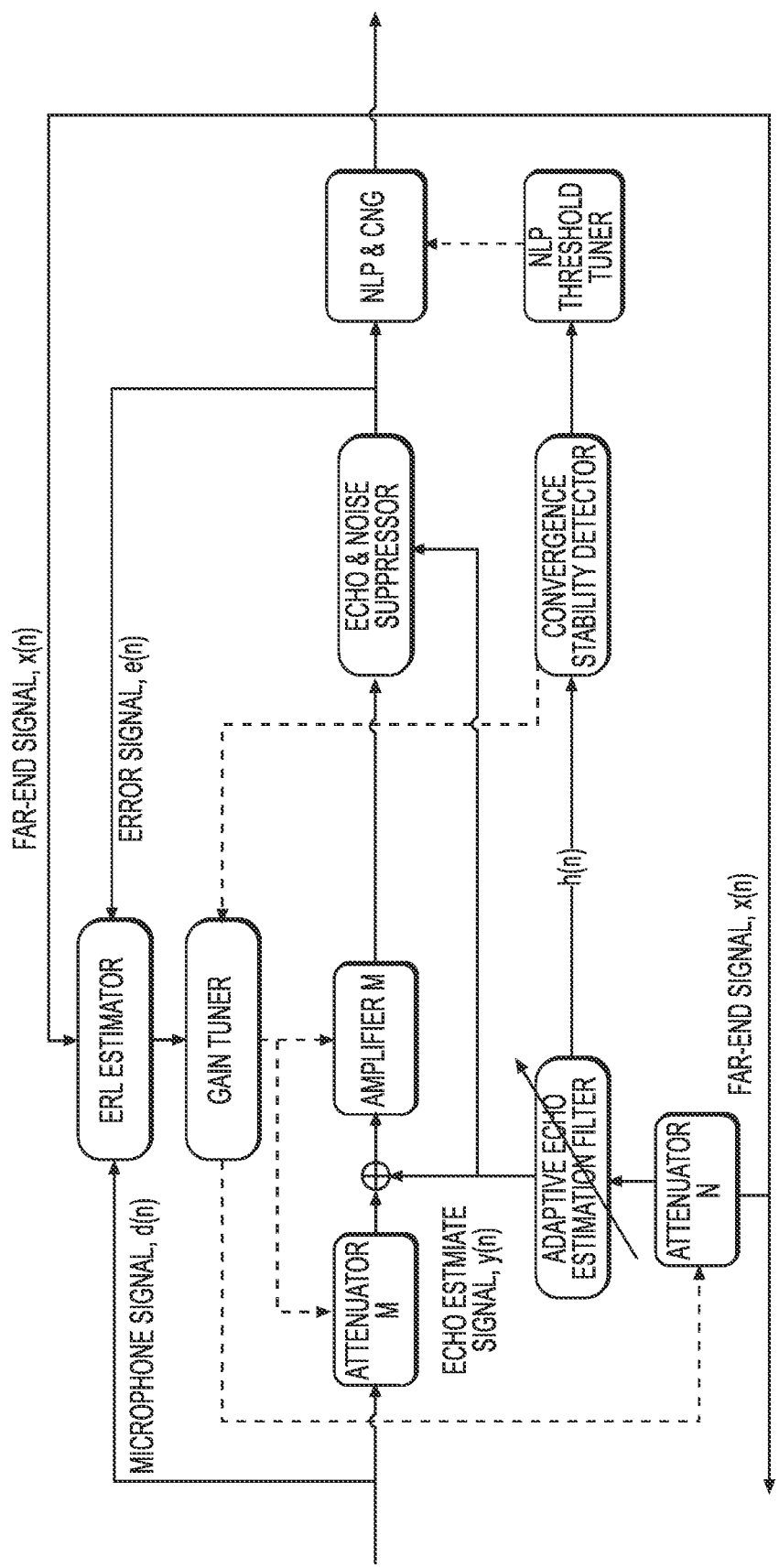
FIG. 2 shows an example of an acoustic echo canceller that implements auto-tuning.

An example of a practical implementation of a threshold control system and a gain control system within an acoustic echo canceller is shown in FIG. 2. FIG. 2 is a high level block diagram of an acoustic echo canceller. The acoustic echo canceller implements an algorithm for estimating the optimal microphone attenuation, far-end attenuation and NLP threshold. The notations $x(n)$, $d(n)$, $e(n)$ and $y(n)$ denote the far-end signal, microphone signal, error signal and echo estimate signals respectively at discrete time instant n. $h(n)$ denotes the impulse response of the echo path and M and N are the gain/attenuation factors applied to the microphone signal and the far-end signal respectively.

The functional blocks of the acoustic echo canceller include an adaptive filter, an echo suppressor and a non-linear processor/comfort noise generator. The adaptive filter models the echo path and synthesises an estimate of the echo signal. The echo suppressor and non-linear processor are configured to deal with any residual echo or noise after the estimated echo has been subtracted from the microphone signal. The residual echo can be quite strong. For example, if the echo path changes dramatically during a period of double talk, tracking of the echo path changes by the adaptation filter may be inhibited by the detected double talk, potentially leading to a strong residual echo. The echo suppressor attenuates the residual echo in dependence on the estimated echo. The non-linear processor removes any remaining residual error by clipping. It often achieves this by simply reducing its gain to zero when its input falls below a time-varying threshold. The comfort noise generator may insert comfort noise during periods of clipping to avoid disconcerting periods of silence.

The acoustic echo canceller shown in FIG. 2 also includes an ERL estimator, a gain tuner (which corresponds to gain tuner 110), a convergence stability detector (which corresponds to convergence unit 102 and/or monitoring unit 109) and a NLP threshold tuner (which corresponds to threshold tuner 103). The ERL estimator estimates the echo return loss using the microphone signal $d(n)$ and the far-end signal $x(n)$. It also receives the error signal $e(n)$. The ERL estimator provides control input to the gain tuner, which in turn controls the attenuators and amplifier. The convergence stability detector estimates the stability of the adaptive filter. It provides control input to the NLP threshold tuner, which in turn controls the threshold at which the NLP reduces the gain of the near-end signal for transmitting to the far-end. It also provides an input to the gain tuner.

The far-end signal $x(n)$ passes through an attenuator en route to the adaptive filter. The adaptive filter models the echo path. It filters the far-end signal to generate an estimate of the echo. That echo forms part of the microphone signal. The echo estimate is subtracted from a (potentially attenuated) microphone signal $d(n)$. If the microphone signal has been attenuated, the amplitude of the echo cancelled signal is lower than it would otherwise have been. The echo cancelled signal is therefore amplified before further processing, to reverse any attenuation applied to the microphone signal. (It is the unamplified version of the echo cancelled signal that is fed back to the adaptive filter). The remaining signal may be attenuated in dependence on the estimated echo using the NLP threshold to remove residual echo, if any. The resulting signal is then transmitted to the far-end.

The convergence stability detector shown in FIG. 2 may have a role to play in both threshold tuning and in gain control. Both the threshold control system and the gain control system may comprise a convergence stability detector (e.g. as convergence unit 102 and monitoring unit 109 in FIGS. 1b and 1c respectively). In combined embodiments, such as that shown in FIG. 2, only one convergence stability detector may be required. It monitors the stability of the adaptive filter and checks whether any of the filter coefficients have saturated. Suitably the detector looks for dominant areas of the modelled echo path, as this is where saturation and instability are most likely to manifest themselves. It also looks at the variation of the filter coefficients in time, which provides an indicator of the filter's stability. The less the filter coefficients vary from a long-term average, the more stable the filter is considered to be.

The convergence stability detector analyses adaptive filter's impulse response so that the non-linear processor threshold can be tuned to provide echo free output. If the adaptive filter has achieved stable convergence, the non-linear processor's threshold is preferably set relatively low to provide full duplex performance. If the adaptive filter has marginal convergence or if convergence is lower than an expected minimal value, the threshold is preferably set to a correspondingly higher value to arrest the residual echo leakage from the echo canceller. Depending on the level of the threshold, this may cause voice breaks during periods of near-end speech.

The attenuations M and N that are applied to the microphone signal and far-end signal respectively are preferably set in dependence on the echo return loss (ERL): a ratio of the microphone signal to the far-end signal. The gain tuner is preferably configured to adjust the relative strengths of the microphone and far-end signal. This controls the feedback that is provided to the adaptive filter, enabling the gain tuner to constrain adaptation by the adaptive filter to within the range prescribed by its integer coefficients. The convergence stability detector provides a further input to the gain tuner. It confirms and sometimes adjusts the attenuations dictated by the ERL estimator.

Both gain tuning and threshold tuning involve analyzing how the adaptive filter has modelled the echo path. Preferably this is only done when the far-end is active, otherwise the echo path will not be modelled at all. The echo canceller may comprise a presence detector (not shown in FIG. 2) for detecting a far-end presence. If the far-end is inactive, or if the echo path modelling is improper, the threshold tuner preferably sets the threshold for half duplex communication. Examples of scenarios in which the echo path modelling might be improper include: (i) the acoustic echo path being highly non-linear; and (ii) a varying pure delay between the far end signal and the echo in the microphone signal.

If the echo canceller is achieving an echo cancellation greater than a predetermined threshold (e.g. more than 20 dB), the threshold tuner may simply set the non-linear processor threshold for full duplex communication. If the echo canceller is providing an echo cancellation below that threshold, then the threshold tuner preferably tunes the threshold to provide the maximum duplex communication possible.

Figure 3:
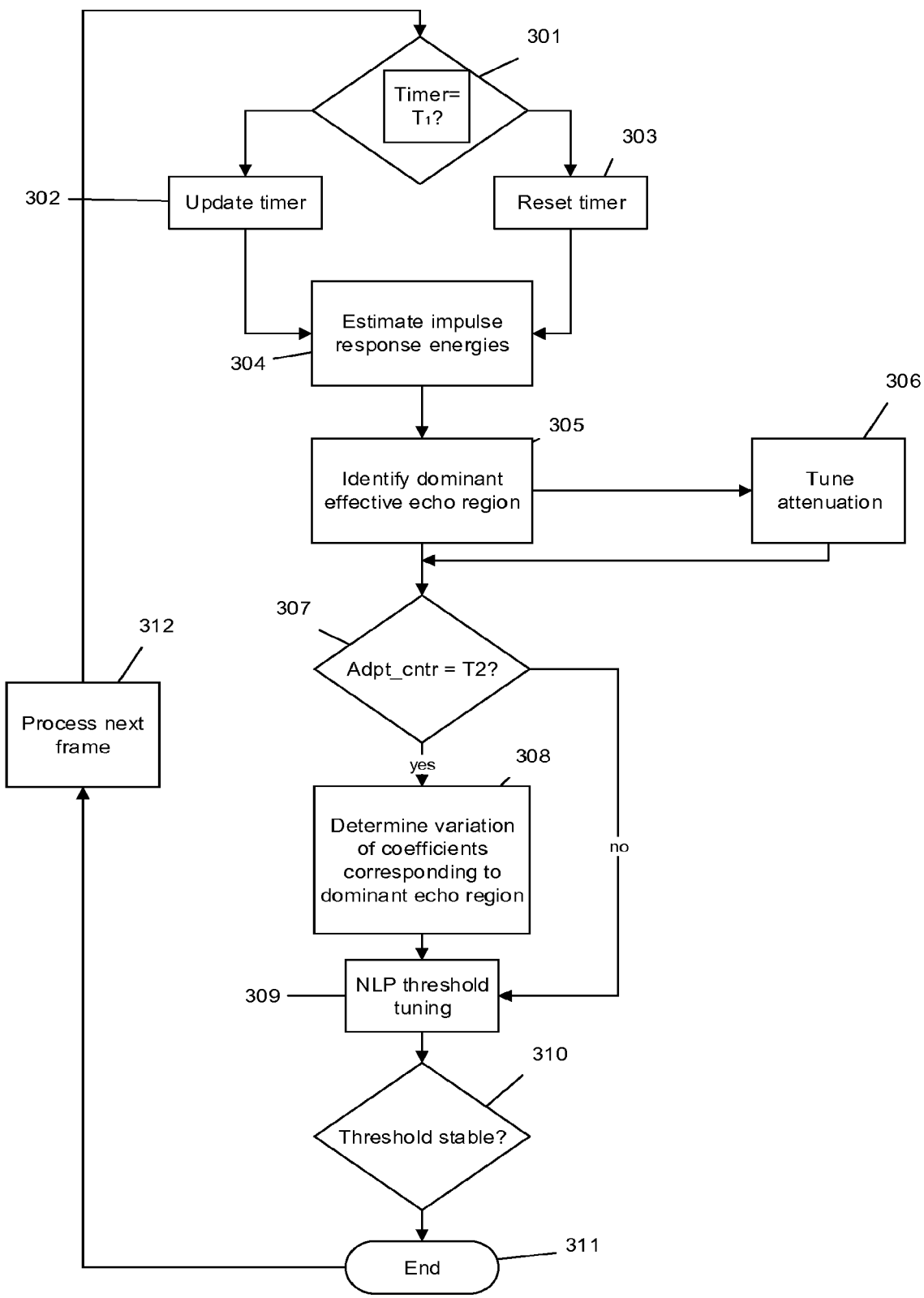
FIG. 3 shows an example of an algorithm for convergence stability detection.

The actions of the gain control system and threshold control system will now be explained in more detail with reference to FIG. 3, which illustrates an example of algorithm for automatically adjusting the operational parameters of an echo canceller encompassing both gain tuning and threshold tuning.

The algorithm starts by comparing a timer with a predetermined time period $T_1$ (step 301). The steps that follow are repeated for a time frame of a microphone signal that has a duration of $T_1$ seconds (as explained below). Therefore, the timer is updated if it is not equal to $T_1$ (step 302) and reset to zero if it is (step 303).

Figure 4:
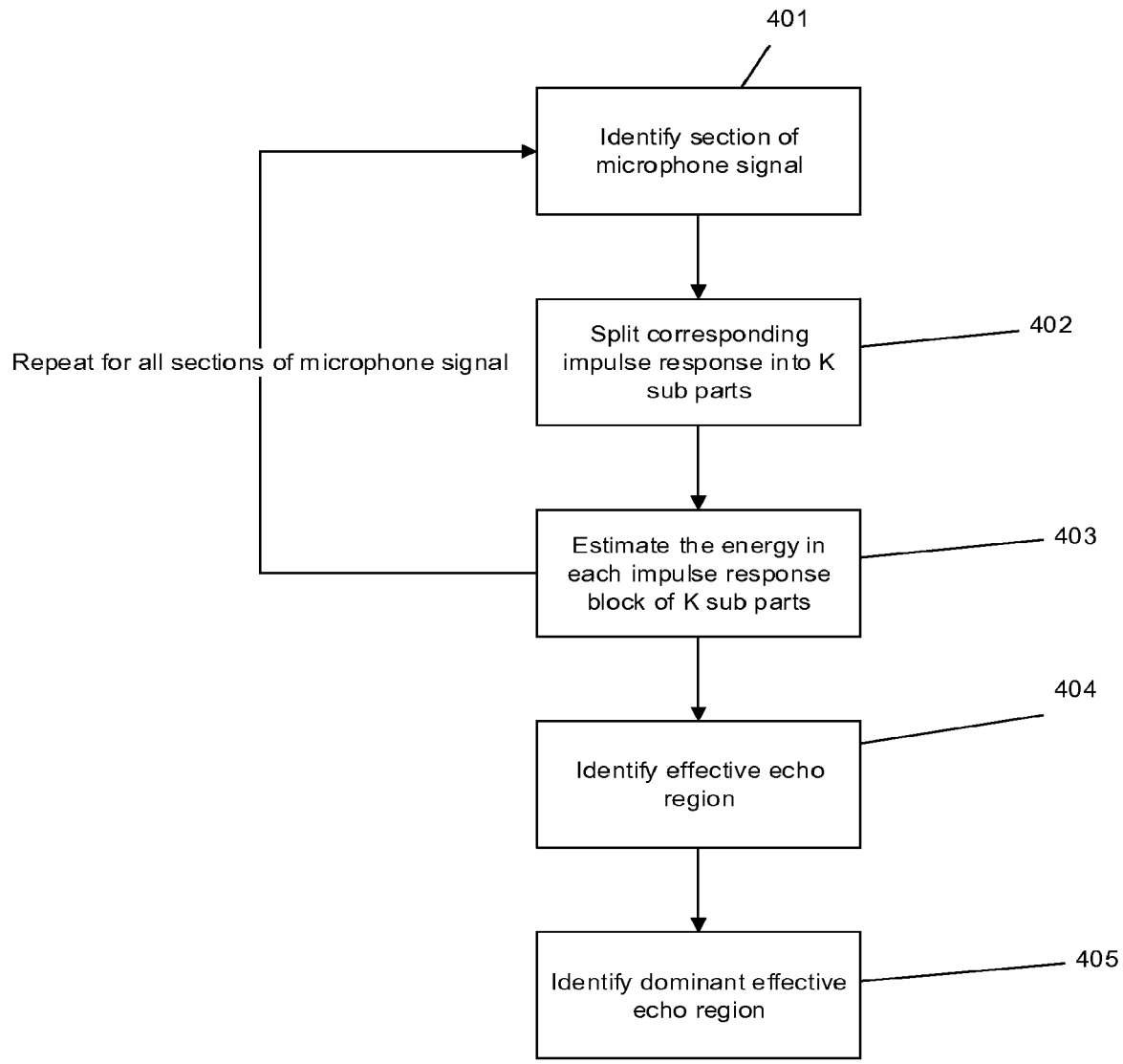
FIG. 4 shows an example of an algorithm for estimating the energy in the impulse response of an adaptive filter.

The algorithm estimates the energy comprised in the impulse response of the adaptive filter by the energy estimator (step 304). In one example, this step may be performed by a parse echo path filter. This process is shown in FIG. 4, which will be described with reference also to FIG. 5.

First, a section of the microphone signal is identified for consideration. This section may be of duration $T_{ms}$ (step 401). This is shown at 501 in FIG. 5. The adaptive filter is configured to continuously adapt its model of the echo path. Therefore, the appropriate impulse response is that which corresponds to the particular section of the microphone signal under consideration. The impulse response may be obtained by any suitable technique, e.g. by using the coefficients of the adaptive filter.

Figure 5:
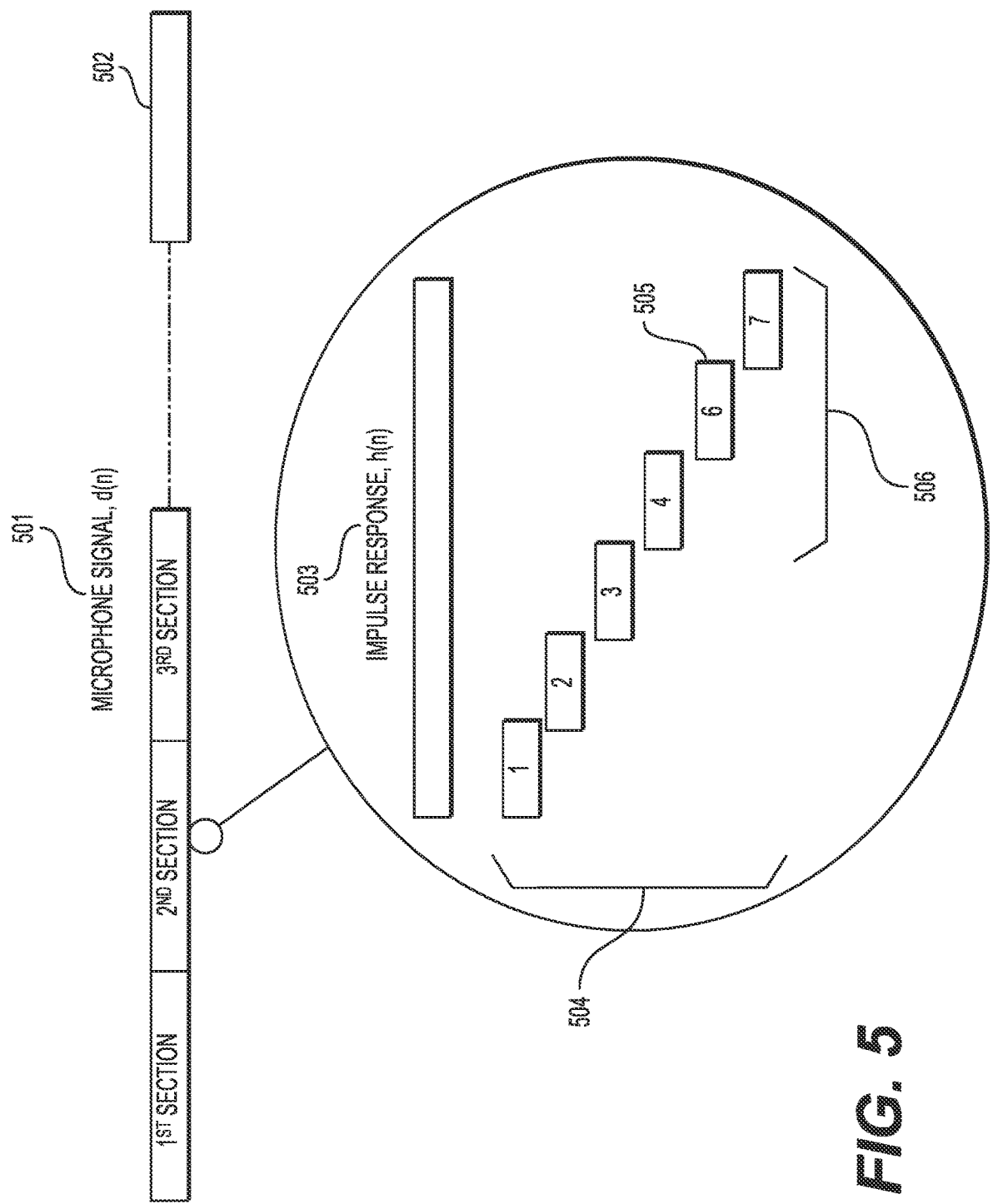
FIG. 5 shows an example of a microphone signal and corresponding impulse response of the adaptive filter.

The impulse response (502), having a tail length N, is split into K sub parts (step 402). Each sub part preferably overlaps at least part of the preceding one. This is shown in FIG. 5: impulse response 502 is split into sub parts 503 that overlap each other 504. Each sub part is denoted $\tilde{W}(l, s)$.

The parse echo path filter then estimates the energy in each block of K subparts of the impulse response (step 403). For each section of the microphone signal, a different block of K subparts is used to estimate the energy. For example, for the first 2 ms section of a 20 ms time frame of the microphone signal, subparts 1, 2 and 3 may be used. Similarly for the second 2 ms of the time frame, subparts 4, 5 and 6 may be used. This grouping is suitably done in such a way so as to cover complete impulse response length (say N=512) corresponding to the whole time frame of the microphone signal. This is also represented by the set of subparts 506 shown in FIG. 5 with respect to the second section of the microphone signal.

This process can be expressed mathematically as follows:

$$(E(i) = \Sigma_{n=p}^{p+T_{SP}*f_s}(h(n))^2 \quad 1 \le i \le T_1/T_{ms} \quad p = m + k(T_{SP} - T_O)f_s$$
$$0 \le k \le K-1 \quad m = 1 + K(i-1)(T_{SP} - T_O)f_s \quad (1)$$

In which:
E(i) is the combined energy of the sub parts comprised in the impulse response corresponding to section i of the microphone signal;
h(n) is the impulse response of the adaptive filter;
$T_1$ is the entire length of the microphone signal to be processed;

$T_{ms}$ is the length of the section of microphone signal under consideration;
$f_s$ is the sampling frequency of the impulse response;
N is the total number of samples in the impulse response under consideration;
K is the number of overlapping sub-parts into which the impulse response has been split;
$T_{SP}$ is the length of each sub part; and
$T_O$ is the length of each overlap.

In one example, each section of the impulse response is of length 4 ms with an overlap of 1 ms. In this example, $T_{SP}$ is 4 ms, $T_O$ is 1 ms and K is 3. In the same example, $T_1$ is 20 ms and $T_{ms}$ is 2 ms.

The process in steps 401 to 403 is repeated for all sections of the microphone signal (i.e. for all i). This results in a set of i combined energy values, E(i). For the example above, in which $T_1$ is 20 ms and $T_{ms}$ is 2 ms, echo estimator generates ten combined energy values E(i) in total.

A predetermined number of the combined energy values are identified as effective energy regions. The filter weights corresponding to this predetermined number of combined energy values are termed the effective echo regions (EERs) (step 404). They are denoted $\widetilde{W}_e(l, p)$. For example, if the predetermined number is three (so that $1 \le p \le 3$), the EER may be identified by placing the combined energies generated by the parse echo path filter in descending order and identifying the top three values. The filter weights corresponding to those three energy values are designated as the three EERs. The dominant EER is identified from the EERs, and the energies they are associated with (step 405).

Returning to FIG. 3, identifying the dominant EER (step 305) may be achieved as follows:

$$E_T(l) = \sum_{i=1}^{T_1/T_{ms}} E(i) \qquad (2)$$

$$E_d(l, p) = \max_{i=1 \text{ to } T_1/T_{ms}} E(i)$$

$$1 \le p \le B$$

Where B is the predetermined number of EERs.

$$\tilde{\beta}_{ed}(l) = \frac{E_d(l)}{E_T(l)} > \beta_{th} \qquad (3)$$

Thus a dominant EER is identified by comparing the ratio of dominant energy $E_d(l)$ to total energy in the effective echo region with a predefined threshold $\beta_{th}$. If more than one of the EERs exceeds the threshold, the EER that generates the largest $\tilde{\beta}_{ed}(l)$ is chosen as the dominant EER.

The dominant EERs may be used in two ways: to provide further gain tuning and tune the NLP threshold.

The energy associated with the adaptive filter's impulse response provides an indication of whether the adaptive filter is close to saturation or not. The adaptive filter in an echo canceller is often implemented in integer format due to the high resource requirements of implementing the filter in a fractional format. The filter coefficients are often represented by 16 bits, and sometimes by 32 bits. The restricted number of bits inherently limits the performance of the acoustic echo canceller in some echo return loss scenarios. For example, when the echo is strong (so that the ERL has a high, negative value), the filter coefficients may saturate or underflow or overflow. One simple way to address this problem is by attenuating the microphone signal used for error estimation. Since the error is used to adapt the filter coefficients, attenuating the microphone signal may prevent them from saturating, overflowing or under flowing by reducing the error.

The dominant EER provides a further indication of how close the filter's coefficients are to saturating. The energy associated with a dominant EER may be compared with one or more thresholds to place it in a particular category. For example, if the energy is below a first threshold, it may be categorised as "very low"; if it is between the first threshold and the second threshold it may be categorised as "marginal"; and if it is above the second threshold it may be categorised as "saturation". The gain tuner may use the category further tune the attenuators. This is shown in Table 6. In the "marginal" category, microphone attenuation may be maintained. In the "very low" category microphone attenuation may be reduced. In the "saturation" category, microphone attenuation may be increased.

TABLE 6

Microphone Attenuation based on dominant EER

| EnergyinDEEREnergy in DEER | Microphone Attenuation |
|---|---|
| Very low | Decrement |
| Marginal | Retain |
| Saturation | Increment |

In a further enhancement, the gain tuner may check what attenuation is being applied to the far-end signal before adjusting the attenuation of the microphone signal. This is appropriate because the ratio of the far-end and microphone signals seen by the adaptive filter determines how it models the echo path. Saturation can be caused by the microphone signal having a high signal strength relative to the far-end signal. Therefore, if it determines that the energy in the dominant EER indicates saturation, the gain tuner may check whether the far-end signal attenuation is already lower than that of the microphone signal. If it is, the microphone attenuation is increased by 1. If it is not, the microphone attenuation is maintained and the far-end attenuation is reduced by 1.

The dominant EER may also be used to tune the threshold of the NLP processor by adjusting an NLP threshold parameter (which expresses the threshold as a value).

The adaptive filter preferably only adapts during periods of single talk, otherwise the filter will try to model the echo path in dependence on components of the microphone signal that have nothing to do with the echo. Most echo cancellers have a double-talk detector so that adaptation of the adaptive filter can be suspended when necessary.

Before analysing the variation of the adaptive filter's coefficients, the threshold tuner preferably checks whether the adaptive filter is currently adapting. It could do this by receiving an input from the echo canceller's double talk detector, which will indicate whether the communication device is experiencing single talk, double talk or talk or other signal energy originating from the near-end only. Another, more direct option, is for the threshold tuner to comprise a counter that keeps track of adaptation by the adaptive filter.

The adaptation counter suitably indicates the number of samples in the current time frame of the microphone signal (which has duration $T_1$) that caused the adaptive filter to adapt. It can be used to classify the acoustic scenario in which the communication device is operating into one of three categories. Table 7 lists the counter value and related region for a time frame of 20 ms. In the table the counter value is expressed in terms of time rather than number of samples.

TABLE 7

Classifications of Regions based on AEEF Adaptation Counter

| AEEF_adpt_cntrAEEF Adaptation Counter | Acoustic Region |
|---|---|
| <2 ms | Noise/Near end |
| ≈10 ms | Double talk |
| ≈17.5 ms ($T_2$) | Single Talk Echo |

If the adaptation counter is high, the region is identified as single talk. If the adaptation counter is marginal, the region is identified as double talk. If the adaptation counter is low, the region is identified as near end/noise.

A parameter termed the modelled echo path variation parameter (or MEPV) is estimated during single talk. It describes the variations in the modelled echo path. For every time frame $T_1$, the MEPV is estimated as the standard deviation of weights in the dominant EER compared with an average set of filter weights:

$$\sigma_s(l) = \sqrt{\sum_{i=1}^{N} \frac{(W(i) - \tilde{W}_{ave}(i))^2}{N}} \quad (4)$$

Another comparison operation, such as variance, might equally be used.

In a normal scenario with a proper adaptation of the adaptive filter, the MEPV value is low. When adaptation of the adaptive filter is incorrect, for example due to an improper ERL estimate or non-linearity in the platform, the MEPV value is high.

The short-term estimated MEPV value is normalized with the peak energy of the effective echo region to provide normalization for platform variations and maintain a stable dynamic range:

$$\sigma_s(l) = \frac{\sigma_s(l)}{\max E_d(l, p)} \quad (5)$$

The long-term average of the MEPV value is then calculated to remove short-term discontinuities/sudden variations:

$$\sigma_{LT}(l) = \gamma^* \sigma_{LT}(1-\gamma)^* \sigma_s(l) \quad (6)$$

where $\gamma$ is a long-term averaging factor.

The long-term average of weights may then be updated using the NLP threshold parameter:

$$W_{ave}(i) = \alpha_{nlp}^* W_{ave}(i) + (1-\alpha_{nlp})^* W(i) \quad (7)$$

The time frame of the microphone signal under consideration is assigned a particular region in dependence on its value of $\sigma_{LT}(l)$. Each region is associated with a particular NLP controller parameter $\alpha$, which is used to update the NLP threshold parameter (as explained below). Each value of the NLP controller parameter corresponds to a particular operational mode of the communication device, as shown in Table 8 below.

TABLE 8

NLP controller parameters assigned to long-term average MEPV

| Long-term average MEPV | NLP controller parameter | Mode of operation | Region |
|---|---|---|---|
| $\sigma_{LT}(l) > \sigma_1$ | $\alpha = 32000$ | Half duplex | A |
| $\sigma_1 > \sigma_{LT}(l) \geq \sigma_2$ | $\alpha = 16000$ | Partial duplex | B |
| $\sigma_2 > \sigma_{LT}(l) \approx 0$ | $\alpha = 1100$ | Full duplex | C |

Another scenario, which is not shown in table 8, is the case where the far-end is active but the impulse response is not at all modelled. This results in very low MEPV estimate but a low value of $\alpha$ would lead to echo leakage in this scenario. In such cases, $\alpha$ is set to its maximum value for half duplex communication.

The decision logic for updating the NLP threshold parameter preferably operates over a group of consecutive time frames. For example, the NLP threshold may be updated based on observations made over 20 time frames of the microphone signal (i.e. 400 ms).

Figure 6:
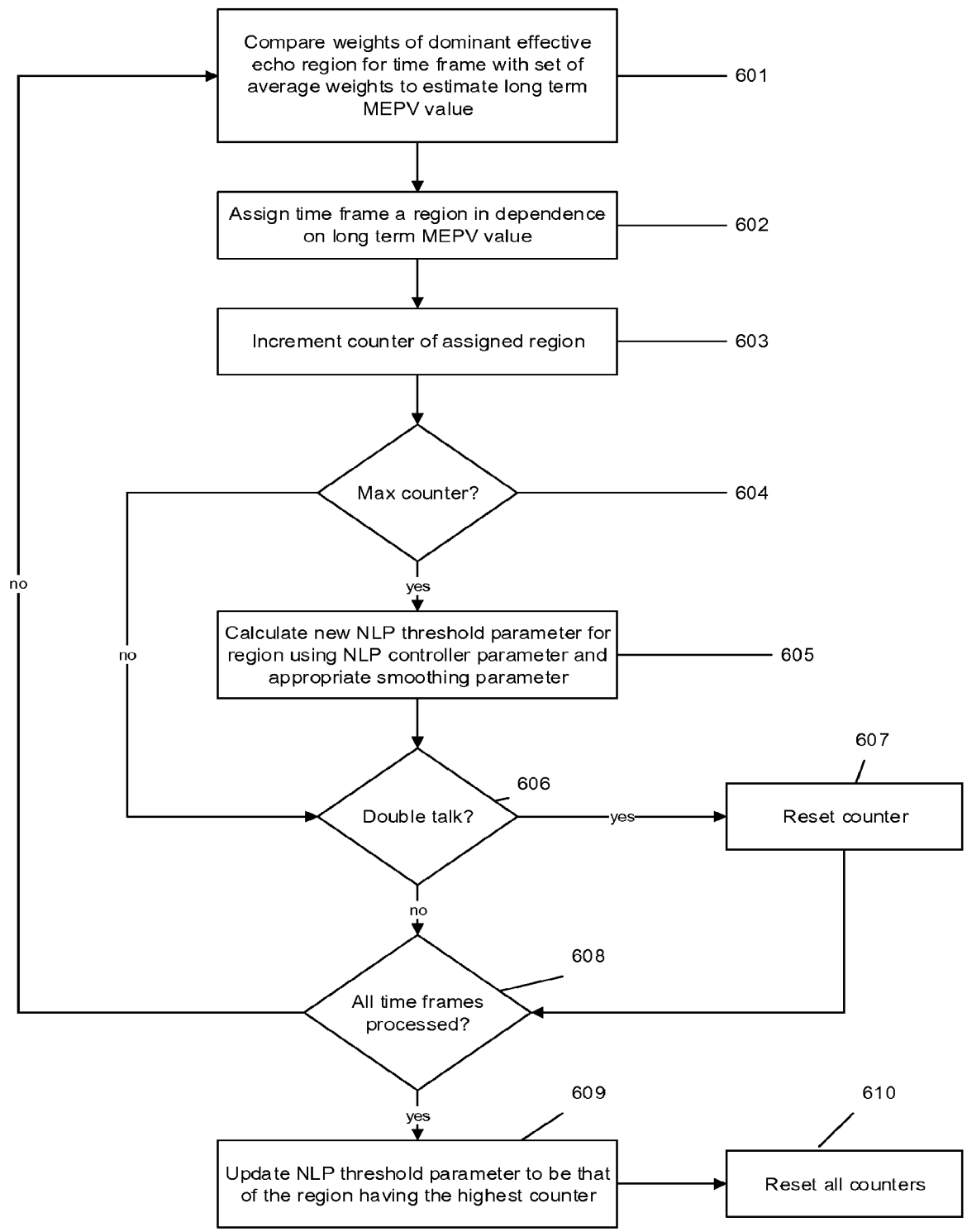
FIG. 6 shows an example of an algorithm for adjusting a non-linear processor threshold.

A method for updating the NLP threshold tuning controller parameter is shown in FIG. 6. A long-term MEPV value $\sigma_{LT}(l)$ is estimated for each time frame (step 601). The MEPV value will fall into one of three categories: A to C, as indicated in table 8 (step 602). Each of those regions is associated with a counter and a region-specific smoothing parameter. A region's counter is incremented each time that the MEPV value falls within that region (step 603). If that region's counter is the maximum of all the regions' counters during the current group of time frames (step 604), then a new NLP threshold parameter for that region is calculated in accordance with equation (8) below (step 605). For example, if the value of $\sigma_{LT}(l)$ places a time frame in region X, where region X could be any one of A, B, or C, region X's counter is incremented by one. If region X's counter is the maximum of all the regions' counters during the current group of 20 time frames, then the value of the NLP threshold parameter for region X, $\alpha_{nlp,x}$, is updated in accordance with:

$$\alpha_{nlp,x} = \gamma_x * \alpha + (1 - \gamma_x) * \alpha_{nlp,x} \quad (8)$$

Where $\alpha$ is the NLP controller parameter assigned to the current time frame of the microphone signal in accordance with table 8 and $\gamma_x$ is a region-specific smoothing parameter. Examples of suitable values for the region-specific smoothing parameters are given in Table 9.

A different region-specific smoothing parameter is applied in the event of a pure delay variation or non-linear platform. In such cases echo leakage will tend to occur before the adaptive filter adapts, leading to a transition directly from region C to region A, i.e. from full duplex to half duplex. A particular region-specific smoothing parameter $\gamma_{C-A}$ is applied in this case so that the NLP threshold parameter update is fast enough to avoid echo leakage.

A check is made as to whether any double talk or non-echo near end signal energy has been detected (step 606). If yes, the counter for the region corresponding to $\sigma_{LT}(l)$ is reset (step 607). A check is then made as to whether the group of time frames has been processed (step 608). If no, the process repeats. The counters are incremented as successive sections of microphone signal are allocated between the different regions. After all time frames in the group have been processed, the NLP threshold parameter for controlling the non-linear processor is updated to be the NLP threshold parameter of the region having the highest counter (step 609). Counters in all regions are then reset (step 610).

Returning to FIG. 3, the confirmation unit checks whether the NLP threshold parameter should be frozen or not. If yes, the NLP threshold tuning parameter is frozen at its current value and the algorithm is stopped. If no, the NLP threshold tuning parameter is updated and the algorithm is repeated. The confirmation unit preferably determines that the tuning parameter is frozen if it has been within a predetermined range for at least a predetermined period of time. A suitable period of time might be 3 seconds, for example.

The convergence stability estimator may be reinitialized with default parameters whenever there is a change in the audio mode or a change in speaker volume level of the communication device.

Figure 7:
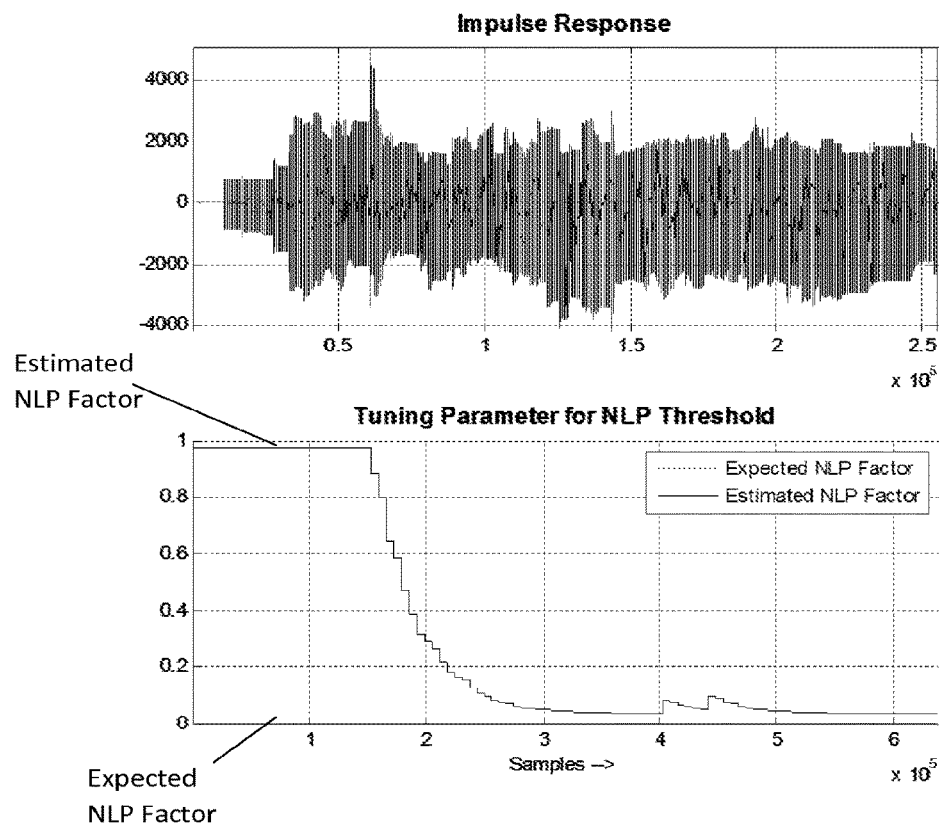
FIG. 7 shows an example of a non-linear processor threshold adapting.

FIG. 7 illustrates NLP threshold for given impulse response and shows how the estimated NLP threshold approaches the expected value after having started at a much higher value.

Performance of the algorithm described herein has been tested in three different acoustic echo regions: pure single talk, double talk and near-end-alone regions. The metric used to evaluate the performance of the algorithm is the time taken to freeze the far-end attenuation, microphone attenuation and NLP thresholds. The estimated values for these parameters were compared with expected values obtained by manually tuning the parameters to provide echo-free, full duplex communication. This comparison was performed across five different reference platforms (each being a particular make and model of communication device).

The algorithm was implemented using the constants and thresholds listed in Table 9. It was integrated into an IMG Voice engine and tested on various different mobile platforms. The evaluation tests used a wideband codec (16 kHz sampling rate) and an adaptive filter tail length of 512 taps (corresponding to a 32 ms tail length). In all testing, the parameters were initialized to the values provided in Table 9 and the response times were noted for handset, hands-free and headset modes during double talk, single talk and near-end alone cases. To test the gain control system's performance, the double talk test case used an overlap region of 80% of the total call duration.

The first point of note is that the gain control algorithm settled on tuning parameters for all audio modes. This confirms that the algorithm provides optimal acoustic echo canceller performance without manual tuning.

(a) Speaker Mode

FIG. 7 illustrates the response time for the devices in hands free mode during single talk and double talk. The response time during single talk has an average value of around 2.1 seconds, while during double talk it is around 2.6 seconds.

(b) Handset Mode

Figure 8:
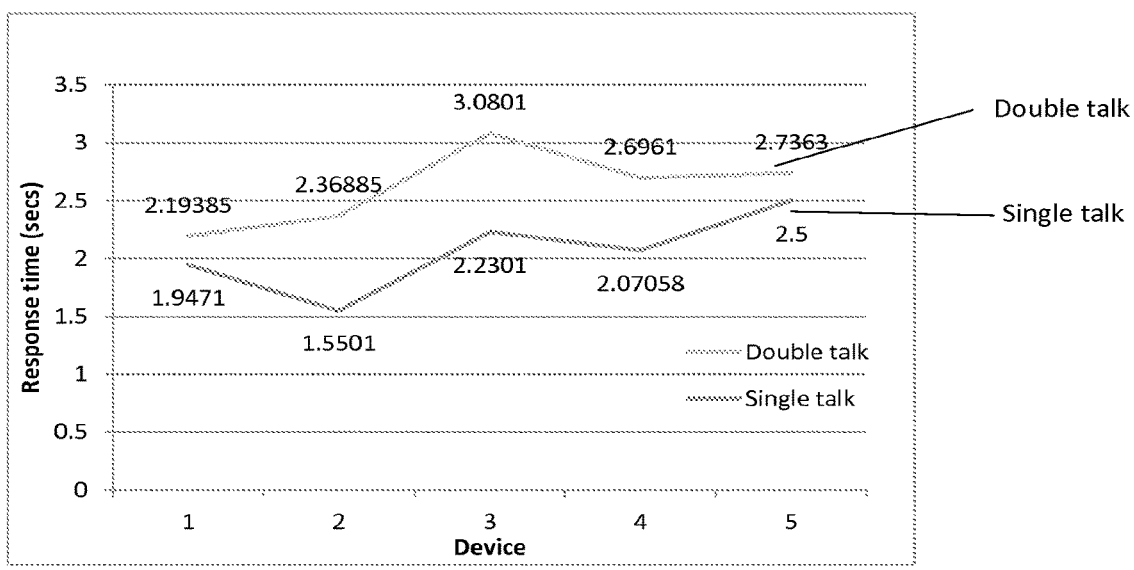
FIG. 8 shows response times of different devices in speaker mode.

FIG. 8 illustrates the response time for the devices in hand set mode during single talk and double talk. Similar to hands free mode, the response time during single talk has an average value of around 2.2 seconds, while during double talk it is around 2.45 seconds.

(c) Headset Mode

Figure 9:
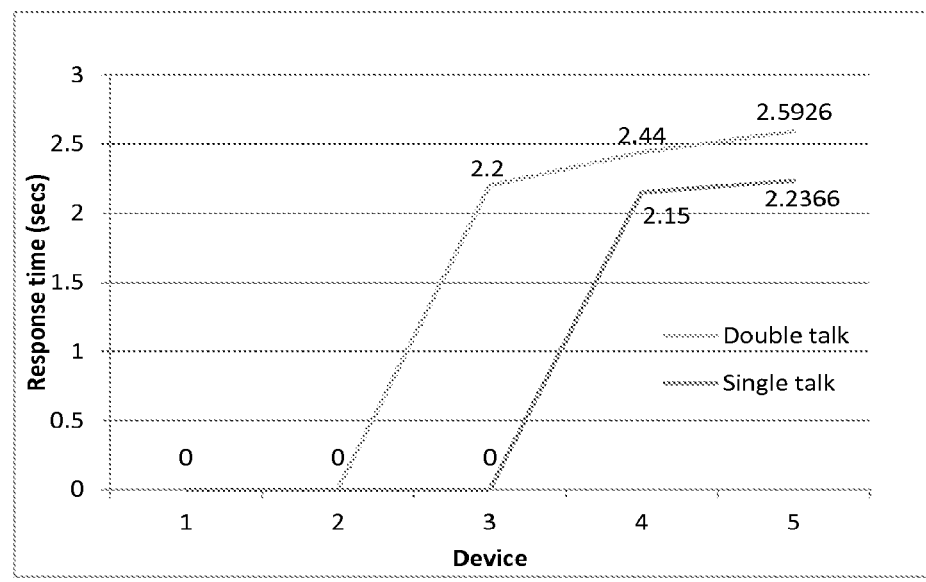
FIG. 9 shows response times of different devices in handset mode.
Figure 10:
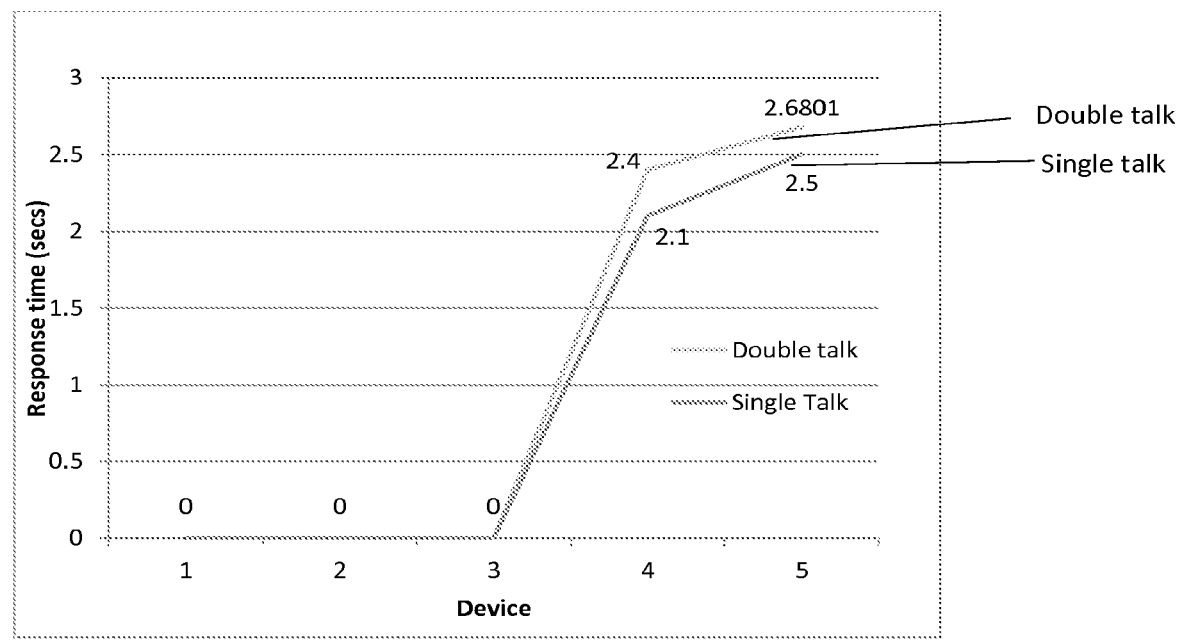
FIG. 10 shows response times of different devices in headset mode.

FIG. 9 illustrates the response time for the devices in head set mode during single talk and double talk. The response time during single talk has an average value of 2.3 seconds while during double talk it is 2.5 seconds.

TABLE 9

Constants and thresholds used

| Parameters | Value |
| --- | --- |
| $\gamma_A$ | 0.95004 |
| $\gamma_B$ | 0.8999 |
| $\gamma_C$ | 0.8001 |
| $\gamma_{C-A}$ | 0.049989 |
| $\beta_{th}$ | 0.2 |
| $\sigma_1$ | 0.0045778 |
| $\sigma_2$ | 0.0022889 |
| $\alpha$ (Half Duplex Mode) | 32000 |
| $\alpha$ (Partial Duplex Mode) | 16000 |
| $\alpha$ (Full Duplex Mode) | 1100 |

Manual tuning of the non-linear processor threshold can therefore be avoided by employing a dynamic threshold controller. This makes it possible for the single talk echo to be suppressed effectively. During double talk, when half duplex may have to be invoked, the user may experience breaks and distortion. Double talk is, however, relatively rare in normal communication.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method for adjusting an attenuation of a microphone signal received by an acoustic echo canceller, the method comprising:
   identifying a number of sections of the microphone signal;
   for each identified section, estimating an energy associated with that section;
   identifying a predetermined number, B, of the largest of the estimated energies as effective echo regions (EERs);
   identifying a dominant EER from the B EERs by comparing the ratio of the energies of each the B EERs to the sum of the energies of each identified section of the microphone signal to a predefined first threshold; and
   adjusting an attenuation of the microphone signal in dependence on the energy of the dominant EER.

2. The method as claimed in claim 1, wherein the adjusting comprises comparing the energy of the dominant EER is to a second threshold and, if the energy of the dominant EER is below the second threshold, the attenuation applied to the microphone signal is decremented.

3. The method as claimed in claim 1, wherein the adjusting comprises comparing the energy of the dominant EER to a third threshold and, if the energy of the dominant EER is above the third threshold, the attenuation applied to the microphone signal is incremented.

4. The method as claimed in claim 1, wherein the acoustic echo canceler comprises an adaptive filter and the energy associated with each identified section is estimated by:
   splitting an impulse response of the adaptive filter which corresponds to the identified section into K sub parts;
   combining the energy of each of the K sub parts to form a combined energy corresponding to the identified section.

5. The method as claimed in claim 4, wherein each of the K sub parts overlaps at least part of the preceding sub part.

6. The method as claimed in claim 4, wherein combining the energy of each of the K sub parts comprises summing the square of the impulse responses of each K sub part.

7. The method as claimed in claim 1, wherein identifying the B largest of the estimated energies as EERs comprises placing the estimated energies in descending order and identifying the top B values.

8. A gain control system comprising:
   an energy estimator configured to identify a dominant effective echo region (EER) in a microphone signal received by an acoustic echo canceller by:
      identifying a number of sections of the microphone signal,
      for each identified section, estimating an energy associated with that section,
      identifying a predetermined number, B, of the largest of the estimated energies as EERs, and
      identifying a dominant EER from the B EERs by comparing the ratio of the energies of each the B EERs to the sum of the energies of each identified section of the microphone signal to a predefined first threshold; and
   a gain tuner configured to adjust an attenuation of the microphone signal in dependence on the energy of the dominant EER.

9. The gain control system as claimed in claim 8, wherein the gain tuner is further configured to adjust the attenuation by comparing the energy of the dominant EER is to a second threshold and, if the energy of the dominant EER is below the second threshold, the attenuation applied to the microphone signal is decremented.

10. The gain control system as claimed in claim 8, wherein the gain tuner is further configured to adjust the attenuation by the adjusting comprises comparing the energy of the dominant EER to a third threshold and, if the energy of the dominant EER is above the third threshold, the attenuation applied to the microphone signal is incremented.

11. The gain control system as claimed in claim 8, wherein the energy estimator is further configured to estimate the energy associated with each identified section by:
   splitting an impulse response of an adaptive filter which corresponds to the identified section into K sub parts;
   combining the energy of each of the K sub parts to form a combined energy corresponding to the identified section.

12. The gain control system as claimed in claim 11, wherein each of the K sub parts overlaps at least part of the preceding sub part.

13. The gain control system as claimed in claim 11, wherein the energy estimator is further configured to combine the energy of each of each of the K sub parts by summing the square of the impulse responses of each K sub part.

14. The gain control system as claimed in claim 8, wherein the energy estimator is further configured to identify the B largest of the estimated energies as EERs by placing the estimated energies in descending order and identifying the top B values.

15. A non-transitory machine readable storage medium having stored thereon processor executable instructions that when executed cause at least one processor to implement a method for adjusting an attenuation of a microphone signal received by an acoustic echo canceller, the method comprising:

identifying a number of sections of the microphone signal;

for each identified section, estimating an energy associated with that section;

identifying a predetermined number, B, of the largest of the estimated energies as effective echo regions, EERs;

identifying a dominant EER from the B EERs by comparing the ratio of the energies of each the B EERs to the sum of the energies of each identified section of the microphone signal to a predefined first threshold; and adjusting an attenuation of the microphone signal in dependence on the energy of the dominant EER.

* * * * *